(12) United States Patent
Kato

(10) Patent No.: US 9,403,984 B2
(45) Date of Patent: Aug. 2, 2016

(54) WATER-RESISTANT REGENERATED COLLAGEN FIBER CONTAINING ZIRCONIUM SALT AND PHOSPHORUS COMPOUND, METHOD FOR PRODUCING THE SAME, AND FIBER BUNDLE FOR HAIR CONTAINING THE SAME

(71) Applicant: KANEKA CORPORATION, Osaka-shi, Osaka (JP)

(72) Inventor: Tomoya Kato, Hyogo (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 14/762,724

(22) PCT Filed: Feb. 21, 2014

(86) PCT No.: PCT/JP2014/054173
§ 371 (c)(1),
(2) Date: Jul. 22, 2015

(87) PCT Pub. No.: WO2014/132889
PCT Pub. Date: Sep. 4, 2014

(65) Prior Publication Data
US 2015/0368469 A1      Dec. 24, 2015

(30) Foreign Application Priority Data

Feb. 28, 2013   (JP) ................. 2013-038754

(51) Int. Cl.
| | |
|---|---|
| *C08L 89/00* | (2006.01) |
| *D06M 11/17* | (2006.01) |
| *D06M 11/20* | (2006.01) |
| *D06M 11/45* | (2006.01) |
| *D06M 11/46* | (2006.01) |
| *D06M 11/71* | (2006.01) |
| *D01F 4/00* | (2006.01) |
| *C08K 3/22* | (2006.01) |
| *C08K 3/32* | (2006.01) |

(52) U.S. Cl.
CPC . *C08L 89/00* (2013.01); *C08K 3/22* (2013.01); *C08K 3/32* (2013.01); *D01F 4/00* (2013.01); *D06M 11/17* (2013.01); *D06M 11/20* (2013.01); *D06M 11/45* (2013.01); *D06M 11/46* (2013.01); *D06M 11/71* (2013.01); *C08K 2003/2244* (2013.01); *C08K 2003/321* (2013.01); *C08K 2003/329* (2013.01)

(58) Field of Classification Search
CPC ........... C08K 3/32; D01F 4/00; D06M 11/20; D06M 11/46; D06M 11/71; C08L 89/00
USPC ......................... 106/151.1; 523/222; 530/356
See application file for complete search history.

(56) References Cited

U.S. PATENT DOCUMENTS

| | | |
|---|---|---|
| 6,160,096 A | 12/2000 | Sakashita et al. |
| 6,713,537 B1 | 3/2004 | Ueda et al. |
| 2004/0073010 A1 | 4/2004 | Ueda et al. |
| 2008/0187996 A1 | 8/2008 | Baca et al. |
| 2009/0260646 A1 | 10/2009 | Masuda |
| 2010/0275939 A1 | 11/2010 | Shinbayashi |
| 2012/0040462 A1 | 2/2012 | Baca et al. |

FOREIGN PATENT DOCUMENTS

| | | |
|---|---|---|
| CN | 1207422 | 2/1999 |
| CN | 101535536 | 9/2009 |
| CN | 101877976 | 11/2010 |
| EP | 0 890 663 A2 | 1/1999 |
| EP | 0 890 663 A3 | 7/1999 |
| EP | 1 229 156 | 8/2002 |
| EP | 0 890 663 B1 | 11/2002 |
| EP | 1 359 245 | 11/2003 |
| JP | 4-308221 | 10/1992 |
| JP | 6-173161 | 6/1994 |
| JP | 2003-027318 | 1/2003 |
| JP | 2012-188787 | 10/2012 |
| KR | 10-0330512 B | 4/2002 |
| WO | 01/06045 | 1/2001 |
| WO | 02/052099 | 7/2002 |
| WO | 2007/032272 | 3/2007 |

*Primary Examiner* — Edward Cain
(74) *Attorney, Agent, or Firm* — Hamre, Schumann, Mueller & Larson, P.C.

(57) ABSTRACT

The present invention relates to a water-resistant regenerated collagen fiber containing 12 wt % or more of zirconium salt in terms of zirconium oxide and 2 wt % or more of phosphorus compound in terms of phosphorus. The present invention also relates to a method for producing a water-resistant regenerated collagen fiber, and the method includes treating a regenerated collagen fiber with a zirconium salt to incorporate the zirconium salt into the regenerated collagen fiber, and then treating the regenerated collagen fiber with a phosphorus compound to incorporate the phosphorus compound into the regenerated collagen fiber, thereby obtaining a water-resistant regenerated collagen fiber containing 12 wt % or more of zirconium salt in terms of zirconium oxide and 2 wt % or more of phosphorus compound in terms of phosphorus. The present invention also relates to a fiber bundle for hair including 30 to 100 wt % of the water-resistant regenerated collagen fiber and 0 to 70 wt % of polyester-based fiber.

20 Claims, 2 Drawing Sheets

WATER-RESISTANT REGENERATED COLLAGEN FIBER CONTAINING ZIRCONIUM SALT AND PHOSPHORUS COMPOUND, METHOD FOR PRODUCING THE SAME, AND FIBER BUNDLE FOR HAIR CONTAINING THE SAME

BACKGROUND OF THE INVENTION

1. Field of the Invention

The present invention relates to a water-resistant regenerated collagen fiber containing a zirconium salt and a phosphorus compound, a method for producing the fiber, and a fiber bundle for hair including the fiber. More particularly, the present invention relates to a water-resistant regenerated collagen fiber suitable for use for hair, artificial fur, and the like, a method for producing the fiber, and a fiber bundle for hair including the fiber.

2. Description of Related Art

Regenerated collagen fibers are protein fibers that retain a distinctive molecular structure derived from collagen, and their feel, gloss, and texture are thus similar to those of human hair, a natural protein fiber with an extremely complex microstructure. For this reason, attempts have been made to use regenerated collagen fibers as fibers for hair and animal fur-like fibers such as artificial fur.

As raw materials of regenerated collagen fiber, animal skin and bones are generally used. Regenerated collagen fibers are produced by subjecting such raw materials to an alkali treatment or an enzyme treatment to obtain water-soluble collagen, and then extruding the water-soluble collagen into an aqueous inorganic salt solution to spin the collagen into regenerated collagen fibers. However, regenerated collagen fibers obtained in such a manner are soluble in water, and thus have poor heat resistance. Therefore, in order to make the regenerated collagen fibers resistant to water and heat, they are treated to be insoluble in water.

As ways to make the regenerated collagen fibers insoluble in water in order to provide the fibers with water and heat resistance, treating the regenerated collagen fibers with aldehyde compounds such as formaldehyde and glutaraldehyde, epoxy compounds, or metal salts such as chrome salt, aluminum salt and zirconium salt are known (Patent Documents 1, 2).

However, each of these treatment methods has problems to be solved. For example, when fibers are subjected to a formaldehyde treatment, free formaldehyde can be detected in the fibers, which leads to health problems. Further, when fibers are treated with various aldehydes and chrome salt, the fibers become strongly colored and are thus not suited for applications requiring light-colored fibers. Further, fibers treated with a zirconium salt do not become colored and have improved resistance to water and heat. However, due to having a shrinkage tendency believed to originate from zirconium, the fibers treated with a zirconium salt can shrink significantly when they are subjected to a wet-heat treatment, a treatment typically carried out when processing fibers into a hair ornament product, and this is problematic in terms of processibility. Further, the fibers treated with a zirconium salt shrink when the hair ornament product is subjected to a hair conditioner treatment, so that the hair style may change. Further, by combining an epoxy compound treatment and an aluminum salt treatment, light-colored regenerated collagen fibers can be obtained. However, as compared with human hair and animal hair that have keratin as the main component, these fibers have poor resistance to water and heat and are vulnerable to thermal damage when styling the fibers using a hair iron or a hair dryer (shrinkage in length, becoming curly or hard). Thus, they do not have satisfactory aesthetic properties. Note that the term "styling" as used herein refers to setting hair in a desired shape by heat at home, a beauty parlor or the like.

Further, attempts have been made to provide the fibers with improved resistance to water and heat by blending a thermoplastic resin with collagen as the raw material (see Patent Document 3). However, blending a thermoplastic resin with collagen leads to a coloration of the fibers, thereby impairing the regenerated collagen fibers' unique gloss and feel similar to those of animal hair.

PRIOR ART DOCUMENTS

Patent Documents

Patent Document 1: JP H4(1992)-308221 A
Patent Document 2: JP H6(1994)-173161 A
Patent Document 3: WO 01/006045

SUMMARY OF THE INVENTION

The present invention provides a light-colored water-resistant regenerated collagen fiber having favorable heat resistance and wet-heat resistance, a method for producing the fiber, and a fiber bundle for hair including the fiber.

The present invention relates to a water-resistant regenerated collagen fiber containing a zirconium salt and a phosphorus compound. The water-resistant regenerated collagen fiber has a zirconium salt content of 12 wt % or more in terms of zirconium oxide and a phosphorus compound content of 2 wt % or more in terms of phosphorus.

It is preferable that the water-resistant regenerated collagen fiber has a zirconium salt content of 17 to 30 wt % in terms of zirconium oxide. The water-resistant regenerated collagen fiber preferably has a phosphorus compound content of 3 to 10 wt % in terms of phosphorus. It is preferable that the water-resistant regenerated collagen fiber further contains an aluminum salt, and it is more preferable that the water-resistant regenerated collagen fiber has an aluminum salt content of 1 wt % or more in terms of aluminum oxide. It is preferable that the water-resistant regenerated collagen fiber is crosslinked with an epoxy compound.

It is preferable that the water-resistant regenerated collagen fiber has a wet-heat treatment shrinkage of 10% or less. Further, it is preferable that the water-resistant regenerated collagen fiber has a hair iron heat resistant temperature of 125° C. or higher, and it is more preferable that the hair iron heat resistant temperature is 160° C. or higher.

Further, the present invention relates to a method for producing a water-resistant regenerated collagen fiber. The method includes: treating a regenerated collagen fiber with a zirconium salt to incorporate the zirconium salt into the regenerated collagen fiber, and then treating the regenerated collagen fiber with a phosphorus compound to incorporate the phosphorus compound into the regenerated collagen fiber, thereby obtaining a water-resistant regenerated collagen fiber containing 12 wt % or more of zirconium salt in terms of zirconium oxide and 2 wt % or more of phosphorus compound in terms of phosphorus.

Further, the present invention relates to a fiber bundle for hair including 30 to 100 wt % of the water-resistant regenerated collagen fiber and 0 to 70 wt % of polyester-based fiber.

It is preferable that the polyester-based fiber contains 5 to 40 parts by weight of brominated epoxy flame retardant with respect to 100 parts by weight of polyester resin, and the polyester resin is polyalkylene terephthalate and/or copolymerized polyester including polyalkylene terephthalate as the main component.

The present invention can provide a light-colored water-resistant regenerated collagen fiber having favorable heat resistance, less vulnerable to thermal damage when being styled using a hair iron or a hair dryer, and less shrinkable when being subjected to a wet-heat treatment by including into the fiber 12 wt % or more of zirconium salt in terms of zirconium oxide and 2 wt % or more of phosphorus compound in terms of phosphorus. The present invention can also provide a fiber bundle for hair including the fiber. According to the production method of the present invention, it is possible to obtain a light-colored water-resistant regenerated collagen fiber, having favorable heat resistance and less shrinkable when being subjected to a wet-heat treatment, by treating a regenerated collagen fiber with a zirconium salt and then with a phosphorus compound to incorporate into the regenerated collagen fiber 12 wt % or more of zirconium salt in terms of zirconium oxide and 2 wt % or more of phosphorus compound in terms of phosphorus.

DETAILED DESCRIPTION OF THE INVENTION

Figure 1:
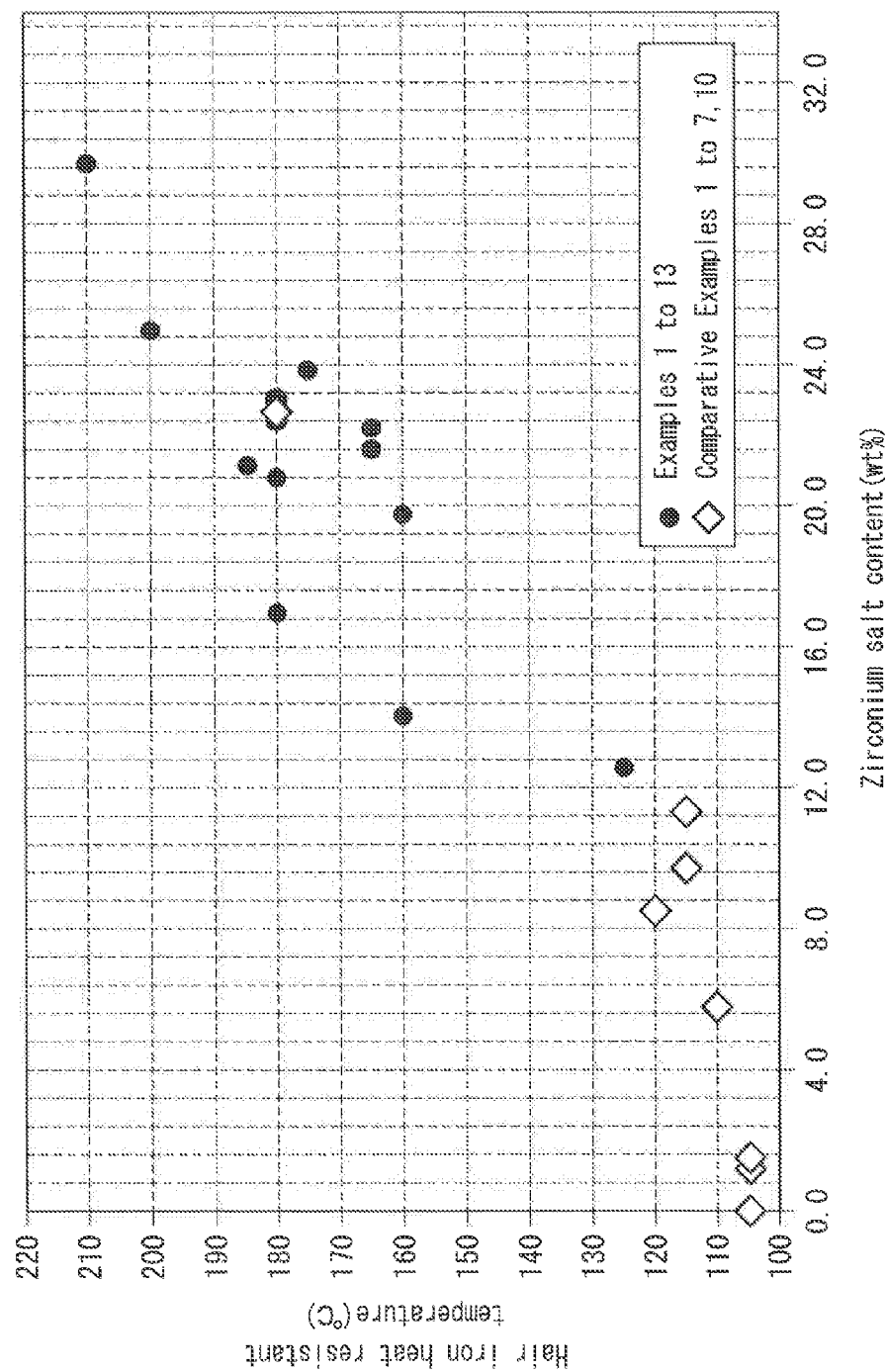
FIG. 1 is a graph showing the relationship between the zirconium salt content in terms of zirconium oxide and the hair iron heat resistant temperature of each of regenerated collagen fibers obtained in Examples 1 to 13 and Comparative Examples 1 to 7 and 10.

In order to solve the aforementioned problems, the present inventor repeated keen examinations. As a result, he found that by treating a regenerated collagen fiber with a zirconium salt and then with a phosphorus compound to incorporate 12 wt % or more of zirconium salt (in terms of zirconium oxide) and 2 wt % of phosphorus compound (in terms of phosphorus) into 100 wt % of regenerated collagen fiber, a light-colored water-resistant regenerated collagen fiber was achievable, which is highly resistant to heat and thus less vulnerable to thermal damage when being styled using a hair iron or a hair dryer, and highly resistant to wet heat and thus less shrinkable when being subjected to a wet-heat treatment, thus leading to the present invention. Conventional regenerated collagen fibers treated with a zirconium salt are highly resistant to heat from a hair iron or a hair dryer but are less resistant to wet heat. Therefore, such fibers shrink significantly when they are subjected to a wet-heat treatment, a treatment typically carried out when processing regenerated collagen fibers into hair ornament products, and are thus difficult to process. Further, when styling hair ornament products including such regenerated collagen fibers with a hair conditioner and a hair iron or a hair dryer, the fibers shrink significantly and cause changes in the hair style. In the present application, it has been found that by treating a regenerated collagen fiber with a zirconium salt and then with a phosphorus compound to incorporate the zirconium salt and the phosphorus compound into the regenerated collagen fiber, the wet-heat resistance of the regenerated collagen fiber can be improved, and the shrinkage of the regenerated collagen fiber during a wet-heat treatment can thus be suppressed. The term "wet-heat treatment" as used herein refers to a heat treatment carried out in the presence of moisture.

(Water-Resistant Regenerated Collagen Fiber)

The water-resistant regenerated collagen fiber of the present invention contains a zirconium salt and a phosphorus compound. The term "water-resistant" as used herein refers to being insoluble in water. Because it contains a zirconium salt, the water-resistant regenerated collagen fiber of the present invention is insoluble in water.

The water-resistant regenerated collagen fiber has a zirconium salt content of 12 wt % or more, preferably 14 wt % or more, more preferably 17 wt % or more, and even more preferably 19 wt % or more in terms of zirconium oxide ($ZrO_2$). The zirconium salt content of less than 12 wt % in terms of zirconium oxide results in insufficient heat resistance. The upper limit of the zirconium salt content may be set within a range where the water-resistant regenerated collagen fiber can retain properties as a fiber. When the zirconium salt content of the regenerated collagen fiber is too high, the tensile strength of the fiber declines. In this case, the fiber may not be able to retain properties required of fibers for hair. The upper limit of the zirconium salt content of the regenerated collagen fiber is preferably 30 wt % or less, more preferably 27 wt % or less, and even more preferably 25 wt % or less in terms of zirconium oxide.

The zirconium salt is not particularly limited, and zirconium sulfate, zirconium acetate, zirconium oxychloride, or the like may be used. These zirconium salts may be used individually or in combination of two or more.

The term "in terms of zirconium oxide" as used herein means that the weight of a zirconium compound is expressed in terms of zirconium oxide having the same number of zirconium atoms. For example, 1 g of zirconium oxide is equivalent to 2.3 g of zirconium sulfate, 2.7 g of zirconium acetate, and 1.4 g of zirconium oxychloride. That is, a regenerated collagen fiber (100 g) containing 2.3 g of zirconium sulfate corresponds to a regenerated collagen fiber containing 1 wt % of zirconium salt in terms of zirconium oxide.

The water-resistant regenerated collagen fiber has a phosphorus compound content of 2 wt % or more, preferably 3 wt % or more, and more preferably 4 wt % or more in terms of phosphorus. When the regenerated collagen fiber contains 2 wt % or more of phosphorus compound in terms of phosphorus, its wet-heat resistance improves. Thus, the shrinkage of the fiber during a wet-heat treatment, a treatment typically carried out when processing regenerated collagen fibers containing a zirconium salt into hair ornament products, is suppressed, so that the processability of the fiber improves. Further, when a hair ornament product including such a regenerated collagen fiber is styled with a hair conditioner, the shrinkage is suppressed, so that changes in hair style can be prevented. That is, in the present invention, the phosphorus compound has the effect of suppressing the shrinkage of the regenerated collagen fiber during a wet-heat treatment and it functions as a material suppressing wet-heat treatment shrinkage. When the phosphorus compound content is less than 2 wt % in terms of phosphorus, the fiber becomes less resistant to wet heat. When such a fiber is subjected to a wet-heat treatment process, the shrinkage (wet-heat treatment shrinkage) exceeds 10%, meaning that the suppression of the shrinkage is not sufficient. The upper limit of the phosphorus compound content of the regenerated collagen fiber may be set within a range where the water-resistant regenerated collagen fiber can retain properties as a fiber. When the phosphorus compound content of the regenerated collagen fiber is too high, the water absorption of the fiber rises dramatically, so that the regenerated collagen fiber may not be able to retain properties as a fiber. Therefore, the upper limit of the phosphorus compound content of the regenerated collagen fiber is preferably 10 wt % or less, more preferably 9 wt % or less, and even more preferably 8 wt % or less in terms of phosphorus.

The phosphorus compound is not particularly limited. Examples of the phosphorus compound include phosphoric acid, phosphates, phosphoric acid derivatives, phosphate derivatives, diphosphoric acid, diphosphates, diphosphoric acid derivatives, diphosphate derivatives, metaphosphoric acid, metaphosphates, metaphosphoric acid derivatives, metaphosphate derivatives, polyphosphoric acid, polyphosphates, polyphosphoric acid derivatives, polyphosphate derivatives, phosphonic acid (phosphorous acid), phosphonates, phosphonic acid derivatives, and phosphonate derivatives. Examples of phosphates include sodium dihydrogenphosphate, disodium hydrogenphosphate, and diammonium hydrogenphosphate. Examples of phosphonic acid derivatives include phenylphosphonic acid. In particular, disodium hydrogenphosphate, phosphonic acid, and diammonium hydrogenphosphate can be used suitably as the phosphorus compound because they are relatively inexpensive and readily available and are in a powder form, so that they can be handled favorably including storage. These phosphorus compounds can be used individually or in combination of two or more.

The term "in terms of phosphorus" as used herein means that the weight of a phosphorus compound is expressed in terms of phosphorus having the same number of phosphorus atoms. For example, 1 g of phosphorus is equivalent to 3.2 g of phosphoric acid, 3.9 g of sodium dihydrogenphosphate, 4.6 g of disodium hydrogenphosphate, 4.3 g of diammonium hydrogenphosphate, 2.6 g of phosphonic acid, and 5.1 g of phenylphosphonic acid. That is, a regenerated collagen fiber (100 g) containing 3.2 g of phosphoric acid corresponds to a regenerated collagen fiber containing 1 wt % of phosphorus compound in terms of phosphorus.

The water-resistant regenerated collagen fiber may be crosslinked with an epoxy compound. The regenerated collagen fiber becomes insoluble in water when crosslinked with an epoxy compound, and its water resistance thus improves. It should be noted that even when the regenerated collagen fiber is not crosslinked with an epoxy compound, the fiber is still insoluble in water because it contains the zirconium salt and thus is crosslinked with zirconium.

The epoxy compound is not particularly limited but a monofunctional epoxy compound can be used suitably. Specific examples of monofunctional epoxy compounds include, but are not particularly limited to: olefin oxides such as ethylene oxide, propylene oxide, butylene oxide, isobutylene oxide, octene oxide, styrene oxide, methylstyrene oxide, epichlorohydrin, epibromohydrin and glycidol; glycidyl ethers such as glycidyl methyl ether, butyl glycidyl ether, octyl glycidyl ether, nonyl glycidyl ether, undecyl glycidyl ether, tridecyl glycidyl ether, pentadecyl glycidyl ether, 2-ethylhexyl glycidyl ether, allyl glycidyl ether, phenyl glycidyl ether, cresyl glycidyl ether, t-butyl phenyl glycidyl ether, dibromophenyl glycidyl ether, benzyl glycidyl ether and polyethylene oxide glycidyl ether; glycidyl esters such as glycidyl formate, glycidyl acetate, glycidyl acrylate, glycidyl methacrylate and glycidyl benzoate; and glycidyl amides.

The amount of the epoxy compound is preferably 0.1 to 500 equivalents with respect to the amount of epoxy compound-reactable amino groups in the regenerated collagen fiber. The lower limit is more preferably 0.5 equivalents or more, and even more preferably 1 equivalent or more. The upper limit is more preferably 100 equivalents or less, and even more preferably 50 equivalents or less. When the amount of the epoxy compound is 0.1 to 500 equivalents, the regenerated collagen fiber's insolubility in water can be made more than adequate and it is also preferable from industrial handling and environmental aspects. It should be noted that the amount of epoxy compound-reactable amino groups in the regenerated collagen fiber can be determined by amino acid analysis.

It is preferable that the water-resistant regenerated collagen fiber further contains an aluminum salt. When the water-resistant regenerated fiber contains an aluminum salt, fiber breakage following a heat treatment using a hair iron is reduced. It is preferable that the water-resistant regenerated collagen fiber has an aluminum salt content of 0.5 wt % or more, more preferably 1 wt % or more, and even more preferably 3 wt % or more in terms of aluminum oxide ($Al_2O_3$). The upper limit of the aluminum salt content of the water-resistant regenerated collagen fiber is not particularly limited. However, in terms of suppressing fiber breakage while allowing the fiber to retain high heat resistance, the aluminum salt content is preferably 17 wt % or less, more preferably 10 wt % or less, and even more preferably 8 wt % or less in terms of aluminum oxide.

The aluminum salt is not particularly limited, and aluminum sulfate, aluminum chloride or aluminum potassium sulfate may be used, for example. These aluminum salts can be used individually or in combination of two or more.

In the present invention, the water-resistant regenerated collagen fiber's zirconium salt content in terms of zirconium oxide and aluminum salt content in terms of aluminum oxide can be calculated by measuring the zirconium (Zr) concentration and the aluminum (Al) concentration in the fiber in the following manner, and then expressing the values obtained in terms of oxide. Further, in the present invention, the water-resistant regenerated collagen fiber's phosphorus compound content in terms of phosphorus can be determined by measuring the phosphorus (P) concentration in the fiber in the following manner.

<Methods for measuring Zr, Al and P Concentrations in Fiber>
<Pretreatment>

A regenerated collagen fiber dried at 105° C. for 2 hours is used as a sample. About 0.1 g of sample is accurately weighed, and then is put in a TFM (Teflon (Registered Trademark)) decomposition vessel. Next, sulfuric acid (ultrahigh-purity sulfuric acid from Kanto Chemical Co., Ltd.), nitric acid (ultrahigh-purity nitric acid from Kanto Chemical Co., Ltd.) and hydrofluoric acid (ultrahigh-purity hydrofluoric acid from Kanto Chemical Co., Ltd.) are added to the vessel to carry out pressurized acid decomposition using a microwave decomposition device. Thereafter, the volume of the decomposition liquid is adjusted to 50 mL with pure water (electrical resistivity: 3.0 Ω·cm or more), and then the volume-adjusted decomposition liquid is diluted with pure water (electrical resistivity: 3.0 Ω·cm or more) as appropriate, thus obtaining a liquid to be measured.

<Measurement Method>

Through ICP emission spectrochemical analysis (ICP emission spectrophotometer "ICPS-8100" from Shimazu Corporation), the concentration of each element in the sample is measured by the absolute calibration curve method, where Y is used as an internal standard substance (measurement wavelength: 371.029 nm). At the same time, a blank test is also carried out. The measurement wavelengths used for Zr, Al, and P are 343.823 nm, 396.153 nm, and 213.620 nm, respectively.

<Calculation Method>

The concentration of each element in the fiber is calculated using the following formula.

Concentration (wt %) of each element in fiber=[ICP measurement value of sample (mg/L)−ICP measurement value of blank (mg/L)]×50 (mL)×dilution factor/[weight of sample (g)×10000]

<Expression in Terms of Oxide>

(1) The zirconium oxide content is calculated using the following formula.

Zirconium oxide content (wt %)=Zr concentration in fiber (wt %)/molar mass of Zr (91.2 g/mol)×molar mass of $ZrO_2$ (123.2 g/mol)

(2) The aluminum oxide content is calculated using the following formula.

Aluminum oxide content (wt %)=Al concentration in fiber (wt %)/molar mass of Al (27.0 g/mol)×[molar mass of $Al_2O_3$ (102.0 g/mol)/2]

In terms of heat resistance, it is preferable that the water-resistant regenerated collagen fiber has a hair iron heat resistant temperature of 125° C. or higher. In terms of achieving more favorable heat resistance, the hair iron heat resistant temperature is preferably 130° C. or higher, more preferably 140° C. or higher, even more preferably 150° C. or higher, and particularly preferably 160° C. or higher. In the present invention, the hair iron heat resistant temperature of the regenerated collagen fiber is measured in a manner described later.

The water-resistant regenerated collagen fiber has a wet-heat treatment shrinkage of 10% or less and has wet-heat resistance. In terms of achieving more favorable wet-heat resistance, the wet-heat treatment shrinkage is preferably 7% or less, and more preferably 5% or less. In the present invention, the wet-heat treatment shrinkage of the regenerated collagen fiber is measured in a manner described later.

In terms of achieving favorable water resistance as well, it is preferable that the water-resistant regenerated collagen fiber has a water absorption of 250% or less. In terms of achieving more favorable water resistance, the regenerated collagen fiber has a water absorption of more preferably 220% or less, and even more preferably 150% or less. In the present invention, the water absorption of the regenerated collagen fiber is measured in a manner described later.

In terms of retaining the strength required of fibers, the water-resistant regenerated collagen fiber has a tensile strength of preferably 1.0 cN/dtex or more, more preferably 1.1 cN/dtex or more, and even more preferably 1.2 cN/dtex or more. In the present invention, the tensile strength of the regenerated collagen fiber is measured in a manner described later.

(Method for Producing Water-Resistant Regenerated Collagen Fiber)

The water-resistant regenerated collagen fiber of the present invention can be produced by treating a regenerated collagen fiber with a zirconium salt to incorporate the zirconium salt into the regenerated collagen fiber and then treating the regenerated collagen fiber with a phosphorus compound to incorporate the phosphorus compound into the regenerated collagen fiber. The regenerated collagen fiber can be obtained by spinning an aqueous solution of solubilized collagen into fiber. The regenerated collagen fiber may be treated with an epoxy compound before treating the fiber with the zirconium salt.

It is preferable to use split hide as a raw material of collagen used in the present invention. The split hide is obtained from, for example, fresh split hides obtained from animals such as cows, or corned rawhide of the same. Such split hide is mainly made of insoluble collagen fibers, and it is used after flesh parts that normally adhere thereto in a net-like form are removed and salt used for preventing putrefaction and alteration is removed.

In the insoluble collagen fibers, impurities are present, which are lipids such as glyceride, phospholipid and free fatty acid, and proteins other than collagen, such as glycoprotein and albumin. When collagen is made into fibers, these impurities significantly affect spinning stability, qualities such as gloss and strength-elongation, and odor. Therefore, it is preferable that these impurities are removed in advance by, for example, immersing the insoluble collagen fibers in lime so as to hydrolyze fat contents in the insoluble collagen fibers and untangle the collagen fibers, and thereafter carrying out the usual leather treatments such as acid/alkali treatment, enzyme treatment, and solvent treatment.

The insoluble collagen subjected to the above-described treatments is then subjected to solubilization treatment so that crosslinked peptide portions are cut. As the solubilization treatment, well-known alkali solubilization, enzyme solubilization, or the like can be applied. Further, the alkali solubilization and the enzyme solubilization may be used in combination.

When applying the aforementioned alkali solubilization, the obtained product is preferably neutralized in an acid such as hydrochloric acid. As the improved conventionally known alkali solubilization, for example, the method described in JP S46(1971)-15033 B may be used.

The aforementioned enzyme solubilization has an advantage that solubilized collagen with a uniform molecular weight can be obtained, and this method can be adopted suitably in the present invention. As the aforementioned enzyme solubilization, for example, the method described in JP S43(1968)-25829 B, or the method described in JP S43 (1968)-27513 B can be used.

When the collagen having been subjected to such solubilization treatment is subjected further to an operation such as pH adjustment, salting-out, water washing, and solvent treatment, it is possible to obtain a regenerated collagen fiber having excellent qualities. Therefore, it is preferable that such treatments are carried out.

The solubilized collagen obtained is dissolved in an acid such as hydrochloric acid, acetic acid or lactic acid, and the solution is adjusted to obtain a collagen aqueous solution having a pH of 2 to 4.5 and a collagen concentration of 1 to 15 wt %. The lower limit of the collagen concentration in the collagen aqueous solution obtained is preferably 2 wt % or more. The upper limit of the collagen concentration is preferably 10 wt % or less. As needed, the collagen aqueous solution may be deaerated by stirring under a reduced pressure, or be filtered to remove fine dust (water-insoluble matters). Furthermore, a suitable amount of an additive such as a stabilizer, a water-soluble polymer compound, or the like may be added to the collagen aqueous solution as needed for the purpose of, for example, the improvement of mechanical strength, the improvement of water resistance and heat resistance, the improvement of gloss, the improvement of spinnability, the prevention of coloration, and preservation.

The collagen aqueous solution is, for example, discharged via a spinning nozzle or a slit and immersed into an aqueous inorganic salt solution, whereby a regenerated collagen fiber can be formed. As the aqueous inorganic salt solution, for example, an aqueous solution of a water-soluble inorganic salt such as sodium sulfate, sodium chloride, or ammonium sulfate is used. Normally, the concentrations of inorganic salts in the aqueous inorganic salt solution are adjusted to 10 to 40 wt %. It is preferable that the pH of the aqueous inorganic salt solution is adjusted to 2 to 13 using a metal salt such as sodium borate or sodium acetate, hydrochloric acid, boric acid, acetic acid, or sodium hydroxide. The lower limit of pH of the aqueous inorganic salt solution is more preferably 4 or more. The upper limit of pH of the aqueous inorganic salt solution is more preferably 12 or less. When the pH of the aqueous inorganic salt solution is in a range of 2 to 13, peptide bonds of collagen become less vulnerable to hydrolysis, whereby a desired fiber can be easily obtained. Further, the temperature of the aqueous inorganic salt solution is not particularly limited, but normally it is desirable that the temperature is 35° C. or lower. When the temperature of the aqueous inorganic salt solution is 35° C. or lower, the soluble collagen does not denature, and the strength of spun fiber does not decline, whereby stable yarn production is enabled. It should be noted that the lower limit of the temperature of the aqueous inorganic salt solution is not particularly limited, but usually it may be adjusted appropriately according to the solubility of the inorganic salt.

In the present invention, the regenerated collagen fiber may be immersed in an epoxy compound or in a solution of the epoxy compound to pre-treat (crosslinking) the regenerated collagen fiber. As the epoxy compound, any of those mentioned above may be used. The amount of the epoxy compound is preferably 0.1 to 500 equivalents with respect to the amount of epoxy compound-reactable amino groups in the regenerated collagen fiber measured by amino acid analysis. The lower limit is more preferably 0.5 equivalents or more, and even more preferably 1 equivalent or more. The upper limit is more preferably 100 equivalents or less, and even more preferably 50 equivalents or less. When the amount of the epoxy compound is 0.1 to 500 equivalents, the regenerated collagen fiber's insolubility in water can be made more than sufficient and it is also preferable from industrial handling and environmental aspects. It should be noted that the regenerated collagen fiber may be crosslinked with the epoxy compound after treating the regenerated collagen fiber with the zirconium salt.

The epoxy compound is used as is or by dissolving it in a variety of solvents. Examples of such solvents include: water; alcohols such as methyl alcohol, ethyl alcohol, and isopropanol; ethers such as tetrahydrofuran and dioxane; halogen organic solvents such as dichloromethane, chloroform and carbon tetrachloride; and neutral organic solvents such as dimethyl formamide (DMF) and dimethyl sulfoxide. These solvents may be used individually or in combinations of two or more. When using water as the solvent, an aqueous solution of inorganic salt such as sodium sulfate, sodium chloride or ammonium sulfate may be used as needed. Generally, the concentrations of inorganic salts in the aqueous inorganic salt solution are adjusted to 10 to 40 wt %. Further, the pH of the aqueous solution may be adjusted using a metal salt such as sodium borate or sodium acetate, hydrochloric acid, boric acid, acetic acid, or sodium hydroxide. In this case, the pH is preferably 6 or more and more preferably 8 or more. When the pH is 6 or more, the reaction between the epoxy groups of the epoxy compound and the amino groups of collagen does not slow down, so that the insolubility in water becomes sufficient. Further, since the pH of the aqueous inorganic salt solution tends to decline over time, a buffer agent may be used as needed.

The temperature at which the regenerated collagen fiber is treated with the epoxy compound is preferably 50° C. or lower. When the treatment temperature is 50° C. or lower, the regenerated collagen fiber does not denature, and the strength of fiber obtained does not decline, whereby stable yarn production is enabled.

Next, the regenerated collagen fiber is treated with the zirconium salt to incorporate the zirconium salt into the regenerated collagen fiber such that the regenerated collagen fiber has a zirconium salt content of 12 wt % or more, preferably 17 wt % or more, and more preferably 19 wt % or more in terms of zirconium oxide ($ZrO_2$). The step of treating the regenerated collagen fiber with the zirconium salt is not particularly limited as long as the zirconium salt can be incorporated into the regenerated collagen fiber. This step is not particularly limited, and the treatment can be carried out by immersing the regenerated collagen fiber in an aqueous solution of the zirconium salt. As a result of this treatment, the water-resistant regenerated collagen fiber finally obtained has a hair iron heat resistant temperature of 125° C. or higher and the regenerated collagen fiber becomes resilient when it gets moist. Thus, the feel of the fiber when it is moist improves, and a shape such as a curl can be given to the fiber in a favorable manner. As the zirconium salt, any of those described above can be used.

The temperature of the zirconium salt aqueous solution is not particularly limited but is preferably 50° C. or lower. When the temperature of the zirconium salt aqueous solution is 50° C. or lower, the regenerated collagen fiber does not denature. In order to prevent inconsistencies in zirconium salt concentration resulting from rapid absorption of the zirconium salt into the regenerated collagen fiber, an inorganic salt such as sodium chloride, sodium sulfate or potassium chloride may be added to the zirconium salt aqueous solution such that the concentrations of such inorganic salts are 1 to 20 wt %. Further, in order to improve the stability of the zirconium salt in water, an organic acid such as lactic acid or an organic acid salt such as sodium citrate may be added to the zirconium salt aqueous solution as appropriate.

Next, the regenerated collagen fiber containing the zirconium salt is treated with the phosphorus compound to incorporate the phosphorus compound into the regenerated collagen fiber such that the regenerated collagen fiber has a phosphorus compound content of 2 wt % or more, preferably 3 wt % or more, and more preferably 4 wt % or more in terms of phosphorus. The step of treating the regenerated collagen fiber with the phosphorus compound is not particularly limited as long as the phosphorus compound can be incorporated into the regenerated collagen fiber. This step is not particularly limited, and the treatment may be carried out by immersing the regenerated collagen fiber treated with the zirconium salt in an aqueous solution containing the phosphorus compound. As the phosphorus compound, any of those described above can be used.

The temperature of the phosphorus compound aqueous solution is not particularly limited but is preferably 70° C. or lower. When the temperature of the phosphorus compound aqueous solution is 70° C. or lower, the regenerated collagen fiber does not denature and its physical properties do not deteriorate.

In the present invention, the regenerated collagen fiber may be further treated with an aluminum salt to incorporate the aluminum salt into the regenerated collagen fiber. The treatment with the aluminum salt is not particularly limited, and it may be carried out at the same time as the treatment with the zirconium salt by using a treatment solution obtained by adding the aluminum salt to the zirconium salt aqueous solution. Other than adding the aluminum salt to the zirconium salt aqueous solution, the treatment can be carried out under the same conditions as the treatment using the zirconium salt aqueous solution. As the aluminum salt, any of those mentioned above can be used.

The regenerated collagen fiber treated with the zirconium salt and the phosphorus compound as above is then washed with water, oiled, and dried. The regenerated collagen fiber can be washed with running water for 10 minutes to 4 hours. As an oil solution used in oiling, an oil solution made of an emulsion such as amino-modified silicone, epoxy-modified silicone or polyether-modified silicone and pluronic-type polyether-based antistatic agent may be used, for example. The drying temperature is preferably 100° C. or lower, and more preferably 75° C. or lower.

Since the water-resistant regenerated collagen fiber of the present invention is light-colored and has favorable heat resistance and wet-heat resistance, it is suitable for use as a fiber for hair and a fiber for blankets. Further, it is also suitable for use as a fiber for sutures, catgut, nonwoven fabrics, and paper.

(Fiber Bundle for Hair)

The water-resistant regenerated collagen fiber of the present invention may be used alone to form a fiber bundle for hair or it may be combined with other fibers to form a fiber bundle for hair. The other fibers are not particularly limited as long as they can be used as fibers for hair. Examples of other fibers include a polyester-based fiber, human hair, animal hair, a polyvinyl chloride-based fiber, a modacrylic fiber, a polyamide-based fiber, and a polyolefin-based fiber.

In terms of achieving favorable heat resistance, flame retardancy and curl retention, the other fiber to be included in the fiber bundle for hair is preferably a polyester-based fiber, and more preferably a flame retardant polyester-based fiber.

The flame retardant polyester-based fiber is not particularly limited. However, it is preferable that the flame retardant polyester-based fiber includes 5 to 40 parts by weight of brominated epoxy flame retardant with respect to 100 parts by weight of one or more polyester resins selected from the group consisting of polyalkylene terephthalate and copolymerized polyester having polyalkylene terephthalate as the main component. The term "main component" as used herein refers to a component contained in an amount of 50 mol % or more. Thus, the "copolymerized polyester having polyalkylene terephthalate as the main component" refers to copolymerized polyester containing 50 mol % or more of polyalkylene terephthalate. Preferably, the "copolymerized polyester having polyalkylene terephthalate as the main component" contains 60 mol % or more, more preferably 70 mol % or more, and even more preferably 80 mol % or more of polyalkylene terephthalate. It is preferable that the flame retardant polyester-based fiber further contains 0 to 5 parts by weight of antimony compound with respect to 100 parts by weight of polyester resin. The flame retardancy of the polyester-based fiber is improved by incorporating an antimony compound into the fiber.

In terms of achieving favorable curl retention and cooling-free property at the time of styling using a hair iron, it is preferable that the fiber bundle for hair includes 30 to 70 wt % of the water-resistant regenerated collagen fiber and 30 to 70 wt % of the flame retardant polyester-based fiber.

EXAMPLES

Next, the present invention will be described in more detail by way of Examples. It should be noted that the present invention is not limited only to Examples. In all of the Examples and Comparative Examples below, the production of regenerated collagen fibers and the oil solution treatment of the water-insoluble regenerated collagen fibers were performed as follows.

Production Example 1

Production of Regenerated Collagen Fiber

Bovine split hide was used as a raw material, and collagen was solubilized with alkali. The solubilized collagen obtained was dissolved in a lactic acid aqueous solution, and the solution was adjusted to obtain a collagen aqueous solution having a pH of 3.5 and a collagen concentration of 7.5 wt %. The collagen aqueous solution obtained was deaerated by stirring under a reduced pressure, delivered to a piston type spinning solution tank, and allowed to stand under a reduced pressure so as to be deaerated. Next, the deaerated collagen aqueous solution was extruded by the piston, delivered in a fixed amount by a gear pump, and filtered with a sintered filter having a pore size of 10 µm. Thereafter, the filtered collagen aqueous solution was passed through a spinning nozzle having 275 pores with a pore size of 0.212 mm and discharged at a spinning rate of 5 m/min into a 25° C. coagulation bath (having a pH adjusted to 11 with sodium hydrogen carbonate and sodium hydroxide) containing 17 wt % of sodium sulfate. Thus, a regenerated collagen fiber was obtained. The regenerated collagen fiber obtained was immersed in an aqueous solution containing 17 wt % of sodium sulfate, 0.02 wt % of sodium hydroxide, and 0.83 wt % of epichlorohydrin at 25° C. for 5 hours, and then at 43° C. for 3.5 hours to treat the fiber with the epoxy compound.

Production Example 2

Oil Solution Treatment

The water-insoluble regenerated collagen fiber was immersed in a bath filled with an oil solution made of an amino-modified silicone emulsion and a polyether-based antistatic agent to let the oil solution adhere to the fiber.

Example 1

A regenerated collagen fiber obtained in accordance with the method described in Production Example 1 was washed with water, and then was immersed for 6 hours in a treatment bath (having a pH adjusted to 3.0 with sodium hydroxide) containing 2.00 wt % of zirconium sulfate in terms of $ZrO_2$ and 0.56 wt % of citric acid monohydrate. Then, the regenerated collagen fiber treated with the zirconium salt was washed with water, and then was immersed in a treatment bath (pH 11.0) containing 1.0 wt % of disodium hydrogenphosphate for 6 hours.

After being washed with water, the water-insoluble regenerated collagen fiber obtained was treated with an oil solution in accordance with the method described in Production Example 2, and then was dried under tension in a hot-air convection dryer adjusted to 70° C.

The regenerated collagen fiber of Example 1 finally obtained contained 23.9 wt % of zirconium sulfate in terms of $ZrO_2$ and 2.4 wt % of disodium hydrogenphosphate in terms of phosphorus.

Example 2

A regenerated collagen fiber obtained in accordance with the method described in Production Example 1 was washed with water, and then was immersed for 6 hours in a treatment bath (having a pH adjusted to 3.0 with sodium hydroxide) containing 2.00 wt % of zirconium sulfate in terms of $ZrO_2$ and 0.56 wt % of citric acid monohydrate. Then, the regenerated collagen fiber treated with the zirconium salt was washed with water, and then was immersed in a treatment bath (pH 11.0) containing 2.0 wt % of disodium hydrogenphosphate for 6 hours.

After being washed with water, the water-insoluble regenerated collagen fiber obtained was treated with an oil solution in accordance with the method described in Production Example 2, and then was dried under tension in a hot-air convection dryer adjusted to 70° C.

The regenerated collagen fiber of Example 2 finally obtained contained 22.6 wt % of zirconium sulfate in terms of $ZrO_2$ and 3.3 wt % of disodium hydrogenphosphate in terms of phosphorus.

Example 3

A regenerated collagen fiber obtained in accordance with the method described in Production Example 1 was washed with water, and then was immersed for 6 hours in a treatment bath (having a pH adjusted to 3.0 with sodium hydroxide) containing 2.00 wt % of zirconium sulfate in terms of $ZrO_2$, 0.56 wt % of citric acid monohydrate and 2.0 wt % of sodium sulfate. Then, the regenerated collagen fiber treated with the zirconium salt was washed with water, and then was immersed in a treatment bath (pH 11.0) containing 5.0 wt % of disodium hydrogenphosphate for 6 hours.

After being washed with water, the water-insoluble regenerated collagen fiber obtained was treated with an oil solution in accordance with the method described in Production Example 2, and then was dried under tension in a hot-air convection dryer adjusted to 70° C.

The regenerated collagen fiber of Example 3 finally obtained contained 21.7 wt % of zirconium sulfate in terms of $ZrO_2$ and 4.2 wt % of disodium hydrogenphosphate in terms of phosphorus.

Example 4

A regenerated collagen fiber obtained in accordance with the method described in Production Example 1 was washed with water, and then was immersed for 6 hours in a treatment bath (having a pH adjusted to 3.0 with sodium hydroxide) containing 2.00 wt % of zirconium sulfate in terms of $ZrO_2$, 0.56 wt % of citric acid monohydrate and 2.0 wt % of sodium sulfate. Then, the regenerated collagen fiber treated with the zirconium salt was washed with water, and then was immersed in a treatment bath (pH 11.0) containing 5.0 wt % of disodium hydrogenphosphate for 8 hours.

After being washed with water, the water-insoluble regenerated collagen fiber obtained was treated with an oil solution in accordance with the method described in Production Example 2, and then was dried under tension in a hot-air convection dryer adjusted to 70° C.

The regenerated collagen fiber of Example 4 finally obtained contained 19.7 wt % of zirconium sulfate in terms of $ZrO_2$ and 4.1 wt % of disodium hydrogenphosphate in terms of phosphorus.

Example 5

A regenerated collagen fiber obtained in accordance with the method described in Production Example 1 was washed with water, and then was immersed for 6 hours in a treatment bath (having a pH adjusted to 3.0 with sodium hydroxide) containing 2.00 wt % of zirconium sulfate in terms of $ZrO_2$, 0.56 wt % of citric acid monohydrate and 2.0 wt % of sodium sulfate. Then, the regenerated collagen fiber treated with the zirconium salt was washed with water, and then was immersed in a treatment bath (pH 11.0) containing 5.0 wt % of disodium hydrogenphosphate for 10 hours.

After being washed with water, the water-insoluble regenerated collagen fiber obtained was treated with an oil solution in accordance with the method described in Production Example 2, and then was dried under tension in a hot-air convection dryer adjusted to 70° C.

The regenerated collagen fiber of Example 5 finally obtained contained 22.2 wt % of zirconium sulfate in terms of $ZrO_2$ and 4.4 wt % of disodium hydrogenphosphate in terms of phosphorus.

Example 6

A regenerated collagen fiber obtained in accordance with the method described in Production Example 1 was washed with water, and then was immersed for 6 hours in a treatment bath (having a pH adjusted to 3.0 with sodium hydroxide) containing 2.00 wt % of zirconium sulfate in terms of $ZrO_2$, 0.56 wt % of citric acid monohydrate and 2.0 wt % of sodium sulfate. Then, the regenerated collagen fiber treated with the zirconium salt was washed with water, and then was immersed in a treatment bath (pH 1.6) containing 1.1 wt % of phosphonic acid.

After being washed with water, the water-insoluble regenerated collagen fiber obtained was treated with an oil solution in accordance with the method described in Production Example 2, and then was dried under tension in a hot-air convection dryer adjusted to 70° C.

The regenerated collagen fiber of Example 6 finally obtained contained 25.0 wt % of zirconium sulfate in terms of $ZrO_2$ and 7.3 wt % of phosphonic acid in terms of phosphorus.

Example 7

A regenerated collagen fiber obtained in accordance with the method described in Production Example 1 was washed with water, and then was immersed for 6 hours in a treatment bath (having a pH adjusted to 3.0 with sodium hydroxide) containing 2.00 wt % of zirconium sulfate in terms of $ZrO_2$, 0.56 wt % of citric acid monohydrate and 2.0 wt % of sodium sulfate. Then, the regenerated collagen fiber treated with the zirconium salt was washed with water, and then was immersed in a treatment bath (pH 8.0) containing 1.8 wt % of diammonium hydrogenphosphate.

After being washed with water, the water-insoluble regenerated collagen fiber obtained was treated with an oil solution in accordance with the method described in Production Example 2, and then was dried under tension in a hot-air convection dryer adjusted to 70° C.

The regenerated collagen fiber of Example 7 finally obtained contained 22.9 wt % of zirconium sulfate in terms of $ZrO_2$ and 5.3 wt % of diammonium hydrogenphosphate in terms of phosphorus.

Example 8

A regenerated collagen fiber obtained in accordance with the method described in Production Example 1 was washed with water, and then was immersed for 6 hours in a treatment bath (having a pH adjusted to 3.0 with sodium hydroxide) containing 1.80 wt % of zirconium sulfate in terms of $ZrO_2$, 0.50 wt % of citric acid monohydrate and 2.0 wt % of sodium sulfate. Then, the regenerated collagen fiber treated with the zirconium salt was washed with water, and then was immersed in a treatment bath (pH 11.0) containing 2.0 wt % of disodium hydrogenphosphate for 6 hours.

After being washed with water, the water-insoluble regenerated collagen fiber obtained was treated with an oil solution in accordance with the method described in Production Example 2, and then was dried under tension in a hot-air convection dryer adjusted to 70° C.

The regenerated collagen fiber of Example 8 finally obtained contained 12.6 wt % of zirconium sulfate in terms of $ZrO_2$ and 3.7 wt % of disodium hydrogenphosphate in terms of phosphorus.

Example 9

A regenerated collagen fiber obtained in accordance with the method described in Production Example 1 was washed with water, and then was immersed for 6 hours in a treatment bath (having a pH adjusted to 4.0 with sodium hydroxide) containing 2.00 wt % of zirconium sulfate in terms of $ZrO_2$, 0.40 wt % of aluminum sulfate in terms of $Al_2O_3$, and 0.56 wt % of citric acid monohydrate. Then, the regenerated collagen fiber treated with the zirconium salt and the aluminum salt was washed with water, and then was immersed in a treatment bath (pH 11.0) containing 5.0 wt % of disodium hydrogenphosphate for 6 hours.

After being washed with water, the water-insoluble regenerated collagen fiber obtained was treated with an oil solution in accordance with the method described in Production Example 2, and then was dried under tension in a hot-air convection dryer adjusted to 70° C.

The regenerated collagen fiber of Example 9 finally obtained contained 20.8 wt % of zirconium sulfate in terms of $ZrO_2$, 1.3 wt % of aluminum sulfate in terms of $Al_2O_3$, and 3.7 wt % of disodium hydrogenphosphate in terms of phosphorus.

Example 10

A regenerated collagen fiber obtained in accordance with the method described in Production Example 1 was washed with water, and then was immersed for 6 hours in a treatment bath (having a pH adjusted to 4.0 with sodium hydroxide) containing 1.00 wt % of zirconium sulfate in terms of $ZrO_2$, 0.90 wt % of aluminum sulfate in terms of $Al_2O_3$, and 0.28 wt % of citric acid monohydrate. Then, the regenerated collagen fiber treated with the zirconium salt and the aluminum salt was washed with water, and then was immersed in a treatment bath (pH 11.0) containing 5.0 wt % of disodium hydrogenphosphate for 6 hours.

After being washed with water, the water-insoluble regenerated collagen fiber obtained was treated with an oil solution in accordance with the method described in Production Example 2, and then was dried under tension in a hot-air convection dryer adjusted to 70° C.

The regenerated collagen fiber of Example 10 finally obtained contained 17.0 wt % of zirconium sulfate in terms of $ZrO_2$, 7.2 wt % of aluminum sulfate in terms of $Al_2O_3$, and 4.8 wt % of disodium hydrogenphosphate in terms of phosphorus.

Example 11

A regenerated collagen fiber obtained in accordance with the method described in Production Example 1 was washed with water, and then was immersed for 6 hours in a treatment bath (having a pH adjusted to 4.0 with sodium hydroxide) containing 1.00 wt % of zirconium sulfate in terms of $ZrO_2$, 2.00 wt % of aluminum sulfate in terms of $Al_2O_3$, and 0.28 wt % of citric acid monohydrate. Then, the regenerated collagen fiber treated with the zirconium salt and the aluminum salt was washed with water, and then was immersed in a treatment bath (pH 11.0) containing 5.0 wt % of disodium hydrogenphosphate for 6 hours.

After being washed with water, the water-insoluble regenerated collagen fiber obtained was treated with an oil solution in accordance with the method described in Production Example 2, and then was dried under tension in a hot-air convection dryer adjusted to 70° C.

The regenerated collagen fiber of Example 11 finally obtained contained 14.1 wt % of zirconium sulfate in terms of $ZrO_2$, 16.8 wt % of aluminum sulfate in terms of $Al_2O_3$, and 5.1 wt % of disodium hydrogenphosphate in terms of phosphorus.

Example 12

A regenerated collagen fiber obtained in accordance with the method described in Production Example 1 was washed with water, and then was immersed for 6 hours in a treatment bath (having a pH adjusted to 3.0 with sodium hydroxide) containing 3.00 wt % of zirconium sulfate in terms of $ZrO_2$, and 0.84 wt % of citric acid monohydrate. Then, the regenerated collagen fiber treated with the zirconium salt was washed with water, and then was immersed in a treatment bath (pH 11.0) containing 10.0 wt % of disodium hydrogenphosphate for 6 hours.

After being washed with water, the water-insoluble regenerated collagen fiber obtained was treated with an oil solution in accordance with the method described in Production Example 2, and then was dried under tension in a hot-air convection dryer adjusted to 70° C.

The regenerated collagen fiber of Example 12 finally obtained contained 29.7 wt % of zirconium sulfate in terms of $ZrO_2$ and 10.1 wt % of disodium hydrogenphosphate in terms of phosphorus.

Example 13

A regenerated collagen fiber obtained in accordance with the method described in Production Example 1 was washed with water, and then was immersed for 6 hours in a treatment bath (having a pH adjusted to 4.0 with sodium hydroxide) containing 2.00 wt % of zirconium sulfate in terms of $ZrO_2$, 0.10 wt % of aluminum sulfate in terms of $Al_2O_3$, and 0.56 wt % of citric acid monohydrate. Then, the regenerated collagen fiber treated with the zirconium salt and the aluminum salt was washed with water, and then was immersed in a treatment bath (pH 11.0) containing 5.0 wt % of disodium hydrogenphosphate for 6 hours.

After being washed with water, the water-insoluble regenerated collagen fiber obtained was treated with an oil solution in accordance with the method described in Production Example 2, and then was dried under tension in a hot-air convection dryer adjusted to 70° C.

The regenerated collagen fiber of Example 13 finally obtained contained 21.2 wt % of zirconium sulfate in terms of $ZrO_2$, 0.7 wt % of aluminum sulfate in terms of $Al_2O_3$, and 5.3 wt % of disodium hydrogenphosphate in terms of phosphorus.

Comparative Example 1

A regenerated collagen fiber obtained in accordance with the method described in Production Example 1 was washed with water, and then was immersed in a treatment bath containing 0.18 wt % of zirconium sulfate in terms of $ZrO_2$ and 0.05 wt % of citric acid monohydrate. Sodium hydroxide was added to the treatment bath gradually over 3.5 hours until the white precipitation of zirconium hydroxide appeared.

After being washed with water, the water-insoluble regenerated collagen fiber obtained was treated with an oil solution in accordance with the method described in Production Example 2, and then was dried under tension in a hot-air convection dryer adjusted to 70° C.

The regenerated collagen fiber of Comparative Example 1 finally obtained contained 1.2 wt % of zirconium sulfate in terms of $ZrO_2$.

Comparative Example 2

A regenerated collagen fiber obtained in accordance with the method described in Production Example 1 was washed with water, and then was immersed in a treatment bath containing 0.36 wt % of zirconium sulfate in terms of $ZrO_2$ and 0.10 wt % of citric acid monohydrate. Sodium hydroxide was added to the treatment bath gradually over 3.5 hours until the white precipitation of zirconium hydroxide appeared.

After being washed with water, the water-insoluble regenerated collagen fiber obtained was treated with an oil solution in accordance with the method described in Production Example 2, and then was dried under tension in a hot-air convection dryer adjusted to 70° C.

The regenerated collagen fiber of Comparative Example 2 finally obtained contained 8.5 wt % of zirconium sulfate in terms of $ZrO_2$.

Comparative Example 3

A regenerated collagen fiber obtained in accordance with the method described in Production Example 1 was washed with water, and then was immersed for 6 hours in a treatment bath (having a pH adjusted to 3.0 with sodium hydroxide) containing 2.00 wt % of zirconium sulfate in terms of $ZrO_2$ and 0.56 wt % of citric acid monohydrate.

After being washed with water, the water-insoluble regenerated collagen fiber obtained was treated with an oil solution in accordance with the method described in Production Example 2, and then was dried under tension in a hot-air convection dryer adjusted to 70° C.

The regenerated collagen fiber of Comparative Example 3 finally obtained contained 22.7 wt % of zirconium sulfate in terms of $ZrO_2$.

Comparative Example 4

A regenerated collagen fiber obtained in accordance with the method described in Production Example 1 was washed with water, and then was immersed for 6 hours in a treatment bath (having a pH adjusted to 3.0 with sodium hydroxide) containing 2.00 wt % of zirconium sulfate in terms of $ZrO_2$ and 0.56 wt % of citric acid monohydrate. Then, the regenerated collagen fiber treated with the zirconium salt was washed with water, and then was immersed in a treatment bath (pH 10.0) containing 1.0 wt % of pyrogallol for 6 hours.

After being washed with water, the water-insoluble regenerated collagen fiber obtained was treated with an oil solution in accordance with the method described in Production Example 2, and then was dried under tension in a hot-air convection dryer adjusted to 70° C.

The regenerated collagen fiber of Comparative Example 4 finally obtained contained 9.7 wt % of zirconium sulfate in terms of $ZrO_2$.

Comparative Example 5

A regenerated collagen fiber obtained in accordance with the method described in Production Example 1 was washed with water, and then was immersed for 6 hours in a treatment bath (having a pH adjusted to 3.0 with sodium hydroxide) containing 2.00 wt % of zirconium sulfate in terms of $ZrO_2$ and 0.56 wt % of citric acid monohydrate. Then, the regenerated collagen fiber treated with the zirconium salt was washed with water, and then was immersed in a treatment bath (pH 10.0) containing 1.0 wt % of pyrocatechol for 6 hours.

After being washed with water, the water-insoluble regenerated collagen fiber obtained was treated with an oil solution in accordance with the method described in Production Example 2, and then was dried under tension in a hot-air convection dryer adjusted to 70° C.

The regenerated collagen fiber of Comparative Example 5 finally obtained contained 5.8 wt % of zirconium sulfate in terms of $ZrO_2$.

Comparative Example 6

A regenerated collagen fiber obtained in accordance with the method described in Production Example 1 was washed with water, and then was immersed for 6 hours in a treatment bath (having a pH adjusted to 3.0 with sodium hydroxide) containing 2.00 wt % of zirconium sulfate in terms of $ZrO_2$ and 0.56 wt % of citric acid monohydrate. Then, the regenerated collagen fiber treated with the zirconium salt was washed with water, and then was immersed in a treatment bath (pH 11.0) containing 5.0 wt % of citric acid monohydrate for 6 hours.

After being washed with water, the water-insoluble regenerated collagen fiber obtained was treated with an oil solution in accordance with the method described in Production Example 2, and then was dried under tension in a hot-air convection dryer adjusted to 70° C.

The regenerated collagen fiber of Comparative Example 6 finally obtained contained 1.5 wt % of zirconium sulfate in terms of $ZrO_2$.

Comparative Example 7

A regenerated collagen fiber obtained in accordance with the method described in Production Example 1 was washed with water, treated with an oil solution in accordance with the method described in Production Example 2, and then was dried under tension in a hot-air convection dryer adjusted to 60° C.

Comparative Example 8

A regenerated collagen fiber obtained in accordance with the method described in Production Example 1 was washed with water, and then was immersed in a treatment bath containing 1.00 wt % of titanium sulfate in terms of $TiO_2$ and 0.75 wt % of citric acid monohydrate. Sodium hydroxide was added to the treatment bath gradually over 3 hours until the white precipitation of titanium hydroxide appeared.

After being washed with water, the water-insoluble regenerated collagen fiber obtained was treated with an oil solution in accordance with the method described in Production Example 2, and then was dried under tension in a hot-air convection dryer adjusted to 70° C.

The regenerated collagen fiber of Comparative Example 8 finally obtained contained 15.2 wt % of titanium sulfate in terms of $TiO_2$. Here, the weight of the titanium sulfate was expressed in terms of the weight of titanium oxide having the same number of titanium atoms.

Comparative Example 9

A regenerated collagen fiber obtained in accordance with the method described in Production Example 1 was washed with water, and then was immersed in a treatment bath containing 1.00 wt % of titanium sulfate in terms of $TiO_2$ and 0.75 wt % of citric acid monohydrate. Sodium hydroxide was added to the treatment bath gradually over 3 hours until the white precipitation of titanium hydroxide appeared. Then, the regenerated collagen fiber obtained was washed with water, and then was immersed in a treatment bath (pH 11.0) containing 5.0 wt % of disodium hydrogenphosphate for 10 hours.

After being washed with water, the water-insoluble regenerated collagen fiber obtained was treated with an oil solution in accordance with the method described in Production Example 2, and then was dried under tension in a hot-air convection dryer adjusted to 70° C.

The regenerated collagen fiber of Comparative Example 9 finally obtained contained 15.0 wt % of titanium sulfate in terms of $TiO_2$ and 3.3 wt % of disodium hydrogenphosphate in terms of phosphorus. Here, the weight of the titanium sulfate was expressed in terms of the weight of titanium oxide having the same number of titanium atoms.

Comparative Example 10

A regenerated collagen fiber obtained in accordance with the method described in Production Example 1 was washed with water, and then was immersed for 6 hours in a treatment bath (having a pH adjusted to 3.0 with sodium hydroxide) containing 1.50 wt % of zirconium sulfate in terms of $ZrO_2$ and 0.42 wt % of citric acid monohydrate. Then, the regenerated collagen fiber treated with the zirconium salt was washed with water, and then was immersed in a treatment bath (pH 11.0) containing 2.0 wt % of disodium hydrogenphosphate for 6 hours.

After being washed with water, the water-insoluble regenerated collagen fiber obtained was treated with an oil solution in accordance with the method described in Production Example 2, and then was dried under tension in a hot-air convection dryer adjusted to 70° C.

The regenerated collagen fiber of Comparative Example 10 finally obtained contained 11.3 wt % of zirconium sulfate in terms of $ZrO_2$ and 3.2 wt % of disodium hydrogenphosphate in terms of phosphorus.

Reference Example 1

A regenerated collagen fiber obtained in accordance with the method described in Production Example 1 was washed with water, and then was immersed in a treatment bath (having a pH adjusted to 4.0 with sodium hydroxide) containing 0.86 wt % of aluminum sulfate in terms of $Al_2O_3$ and 0.64 wt % of citric acid monohydrate. Thereafter, sodium hydroxide was added to the treatment bath once every two hours over 10 hours to adjust the pH of the treatment bath to 5.

After being washed with water, the water-insoluble regenerated collagen fiber obtained was treated with an oil solution in accordance with the method described in Production Example 2, and then was dried under tension in a hot-air convection dryer adjusted to 70° C.

The regenerated collagen fiber of Reference Example 1 finally obtained contained 17.1 wt % of aluminum sulfate in terms of $Al_2O_3$.

Reference Example 2

A regenerated collagen fiber obtained in accordance with the method described in Production Example 1 was washed with water, and then was immersed for 6 hours in a treatment bath (having a pH adjusted to 3.0 with sodium hydroxide) containing 2.00 wt % of zirconium sulfate in terms of $ZrO_2$ and 0.56 wt % of citric acid monohydrate. Then, the regenerated collagen fiber treated with the zirconium salt was washed with water, and then was immersed in a treatment bath (pH 11.0) containing 5.0 wt % of boric acid for 6 hours.

After being washed with water, the water-insoluble regenerated collagen fiber obtained was treated with an oil solution in accordance with the method described in Production Example 2, and then was dried under tension in a hot-air convection dryer adjusted to 70° C.

The regenerated collagen fiber of Reference Example 2 finally obtained contained 12.4 wt % of zirconium sulfate in terms of $ZrO_2$.

For the regenerated collagen fibers finally obtained in Examples 1 to 13, Comparative Examples 1 to 10, and Reference Examples 1 and 2, the zirconium salt content in terms of zirconium oxide, the aluminum salt content in terms of aluminum oxide, and the titanium sulfate content in terms of titanium oxide were calculated by measuring the zirconium (Zr), aluminum (Al) and titanium (Ti) concentrations in each fiber in the following manner, and expressing the values obtained in terms of oxides. Further, the phosphorus compound content (in terms of phosphorus) of each regenerated collagen fiber finally obtained was evaluated by measuring the phosphorus (P) concentration in each fiber in the following manner.

<Methods for Measuring Zr, Al, Ti and P Concentrations in Fibers>

<Pretreatment>

Each regenerated collagen fiber dried at 105° C. for 2 hours was used as a sample. About 0.1 g of sample was accurately weighted, and was put in a TFM (Teflon (Registered Trademark)) decomposition vessel. Then, sulfuric acid (ultrahigh-purity sulfuric acid from Kanto Chemical Co., Ltd.), nitric acid (ultrahigh-purity nitric acid from Kanto Chemical Co., Ltd.) and hydrofluoric acid (ultrahigh-purity hydrofluoric acid from Kanto Chemical Co., Ltd.) were added to the vessel to carry out pressurized acid decomposition using a microwave decomposition device. Subsequently, the volume of the decomposition liquid was adjusted to 50 mL with pure water (electrical resistivity: 3.0 Ω·cm or more), and then the volume-adjusted decomposition liquid was diluted with pure water (electrical resistivity: 3.0 Ω·cm or more) as appropriate, thus obtaining a liquid to be measured.

<Measurement Method>

Through ICP emission spectrochemical analysis (ICP emission spectrophotometer "ICPS-8100" from Shimazu Corporation), the concentration of each element in the sample was measured by the absolute calibration curve method, where Y was used as an internal standard substance (measurement wavelength: 371.029 nm). At the same time, a blank test was also carried out. The measurement wavelengths used for Zr, Al, Ti and P were 343.823 nm, 396.153 nm, 334.941 nm, and 213.60 nm, respectively.

<Calculation Method>

The concentration of each element in each fiber was calculated using the following formula.

Concentration (wt %) of each element in fiber=[ICP measurement value of sample (mg/L)–ICP measurement value of blank (mg/L)]×50 (mL)×dilution factor/[weight of sample (g)×10000]

<Expression in Terms of Oxide>

(1) The zirconium oxide content was calculated using the following formula.

Zirconium oxide content (wt %)=Zr concentration in fiber (wt %)/molar mass of Zr (91.2 g/mol)×molar mass of $ZrO_2$ (123.2 g/mol)

(2) The aluminum oxide content was calculated using the following formula.

Aluminum oxide content (wt %)=Al concentration in fiber (wt %)/molar mass of Al (27.0 g/mol)×[molar mass of $Al_2O_3$ (102.0 g/mol)/2]

(3) The titanium oxide content was calculated using the following formula.

Titanium oxide content (wt %)=Ti concentration in fiber (wt %)/molar mass of Ti (22.0 g/mol)×[molar mass of $TiO_2$ (79.9 g/mol)]

For each of the regenerated collagen fibers of Examples 1 to 13, Comparative Examples 1 to 10 and Reference Examples 1 and 2, the hair iron heat-resistant temperature, the wet-heat treatment shrinkage, the water absorption and the tensile strength were measured in the following manner. The results are provided in Table 1 below. Further, for each of the regenerated collagen fibers of Examples 2, 4, 8 to 11 and 13, the fiber breakage was evaluated in the following manner. The results are provided in Table 1. Table 1 also shows metal contained in the fibers, the content of the metal compound in terms of metal oxide (metal compound content), the content of the phosphorus compound in terms of phosphorus (phosphorus compound content), and the color of each regenerated collagen fiber.

(Heat Resistance)

The heat resistance of each fiber was evaluated by measuring in an atmosphere having a temperature of 20±2° C. and a relative humidity of 65±2% the hair iron heat resistant temperature of each fiber in the following manner. First, each fiber was opened adequately, and then was made into a fiber bundle having a total fineness of about 10000 dtex. One end (2 cm) of the fiber bundle was nipped for 5 seconds with a hair iron adjusted to each temperature, and the highest of temperatures at which the end of the fiber bundle did not become curled was set as the hair iron heat resistant temperature. The temperature of the hair iron was changed in 5° C. increments, and a new fiber bundle was used for measurement at each temperature.

(Wet-Heat Treatment Shrinkage)

The wet-heat treatment shrinkage of each fiber was measured in the following manner. It should be noted that a wet-heat treatment is a heat treatment performed in the presence of moisture.

(1) A regenerated collagen fiber was cut into length $L_1$ in advance.
(2) The regenerated collagen fiber being cut was aligned in parallel with an aluminum pipe, fixed to the aluminum pipe with a bandage, and was incubated in an autoclave at 75° C. for 1.5 hours.
(3) The regenerated collagen fiber fixed to the aluminum pipe was incubated in a hot-air convection dryer at 90° C. for 0.5 hours.
(4) Subsequently, the fiber was incubated in the autoclave at 85° C. for 0.5 hours.
(5) The fiber was incubated in the hot-air convection dryer at 90° C. for 0.5 hours.
(6) The fiber was removed from the aluminum pipe, and the length ($L_2$) of the regenerated collagen fibers after the wet-heat treatment was measured.
(7) The wet-heat treatment shrinkage of the fiber was calculated using the following formula.

Wet-heat treatment shrinkage=$(L_1-L_2)/L_1\times100$(%)

(Tensile Strength)

A staple (fineness: 80 dtex, length: 2 cm) was used as a sample, and in an atmosphere having a temperature of 20±2° C. and a relative humidity of 65±2%, the tensile strength was measured using a Tension universal tester (RTC-1210A) from A&D Company Ltd. at a tensile rate of 20 mm/min.

(Water absorption)

Each regenerated collagen fiber was immersed in 50° C. hot water for 1 hour to let it absorb water adequately. Then, the weight of the regenerated collagen fiber after removing water adhered onto the fiber surface was set as $W_1$ and the weight of the regenerated collagen fiber dried in an hot-air convection dryer at 105° C. for 3 hours was set as $W_2$, and the water absorption was calculated using the following formula.

Water absorption=$(W_1-W_2)/W_2\times100$(%)

(Fiber Breakage)

First, each regenerated collagen fiber was opened adequately, and was made into a fiber bundle (total fineness: 80000 dtex, number of yarns: 1000, length: 20 cm). The fiber bundle was nipped with a hair iron (from Golden Supreme Inc.) adjusted to 180° C., and then the hair iron was slid from the base to the end of the fiber bundle over 5 seconds, and this operation was repeated twice. Then, the ironed fiber bundle was pulled 20 times from the base to the end at 0.5 to 1.0 kg force, and the number of yarns thus broken was counted.

TABLE 1

| | Epoxy compound treatment | Metal contained and content of metal compound in terms of metal oxide (wt %) | | Compound other than metal compound | Phosphorus compound content in terms of phosphorus (wt %) | Hear iron heat resistant temperature (° C.) | Wet-heat treatment shrinkage (%) | Color | Tensile strength (cN/dtex) | Water absorption (%) | Fiber breakage (number) |
|---|---|---|---|---|---|---|---|---|---|---|---|
| Ex. 1 | Yes | Zr | 23.9 | disodium hydrogenphosphate | 2.4 | 175 | 10.0 | white | 1.7 | 64.7 | N.D. |
| Ex. 2 | Yes | Zr | 22.6 | disodium hydrogenphosphate | 3.3 | 180 | 7.0 | white | 1.5 | 123.5 | 251 |
| Ex. 3 | Yes | Zr | 21.7 | disodium hydrogenphosphate | 4.2 | 165 | 3.7 | white | 1.7 | 126.2 | N.D. |

TABLE 1-continued

| | Epoxy compound treatment | Metal contained and content of metal compound in terms of metal oxide (wt %) | Compound other than metal compound | Phosphorus compound content in terms of phosphorus (wt %) | Hear iron heat resistant temperature (° C.) | Wet-heat treatment shrinkage (%) | Color | Tensile strength (cN/dtex) | Water absorption (%) | Fiber breakage (number) |
|---|---|---|---|---|---|---|---|---|---|---|
| Ex. 4 | Yes | Zr 19.7 | disodium hydrogenphosphate | 4.1 | 160 | 5.2 | white | 1.7 | 130.1 | 234 |
| Ex. 5 | Yes | Zr 22.2 | disodium hydrogenphosphate | 4.4 | 165 | 5.2 | white | 1.8 | 133.4 | N.D. |
| Ex. 6 | Yes | Zr 25.0 | Phosphonic acid | 7.3 | 200 | 4.7 | white | 1.3 | 142.3 | N.D. |
| Ex. 7 | Yes | Zr 22.9 | dianmonium hydrogenphosphate | 5.3 | 180 | 4.0 | white | 1.6 | N.D. | N.D. |
| Ex. 8 | Yes | Zr 12.6 | disodium hydrogenphosphate | 3.7 | 125 | 3.3 | white | 1.8 | 108.7 | 213 |
| Ex. 9 | Yes | Zr/Al 20.8/1.3 | disodium hydrogenphosphate | 3.7 | 180 | 5.3 | white | N.D. | N.D. | 97 |
| Ex. 10 | Yes | Zr/Al 17.0/7.2 | disodium hydrogenphosphate | 4.8 | 180 | 4.1. | white | N.D. | N.D. | 36 |
| Ex. 11 | Yes | Zr/Al 14.1/16.8 | disodium hydrogenphosphate | 5.1 | 160 | 4.0. | white | N.D. | N.D. | 15 |
| Ex. 12 | Yes | Zr 29.7 | disodium hydrogenphosphate | 10.1 | 210 | N.D. | white | 0.8 | 215.8 | N.D. |
| Ex. 13 | Yes | Zr/Al 21.2/0.7 | disodium hydrogenphosphate | 5.3 | 185 | 5.7 | white | N.D. | N.D. | 138 |
| Comp. Ex. 1 | Yes | Zr 1.2 | None | 0 | 105 | N.D. | white | 2.0 | 73.5 | N.D. |
| Comp. Ex. 2 | Yes | Zr 8.5 | None | 0 | 120 | N.D. | white | N.D. | N.D. | N.D. |
| Comp. Ex. 3 | Yes | Zr 22.7 | None | 0 | 180 | 16.0 | white | N.D. | 68.2 | N.D. |
| Comp. Ex. 4 | Yes | Zr 9.7 | pyrogallol | 0 | 115 | 8.0 | white | N.D. | N.D. | N.D. |
| Comp. Ex. 5 | Yes | Zr 5.8 | pyrocatechol | 0 | 110 | 4.7 | white | N.D. | N.D. | N.D. |
| Comp. Ex. 6 | Yes | Zr 1.5 | citric acid | 0 | 105 | 2.3 | white | N.D. | N.D. | N.D. |
| Comp. Ex. 7 | Yes | None 0 | None | 0 | 105 | N.D. | white | N.D. | N.D. | N.D. |
| Comp. Ex. 8 | Yes | Ti 15.2 | None | 0 | 110 | N.D. | white | N.D. | N.D. | N.D. |
| Comp. Ex. 9 | Yes | Ti 15.0 | disodium hydrogenphosphate | 3.3 | 110 | N.D. | white | N.D. | N.D. | N.D. |
| Comp. Ex. 10 | Yes | Zr 11.3 | disodium hydrogenphosphate | 3.2 | 115 | 4.0 | white | 1.9 | N.D. | N.D. |
| Ref. Ex. 1 | Yes | Al 17.1 | None | 0 | 120 | N.D. | white | N.D. | N.D. | N.D. |
| Ref. Ex. 2 | Yes | Zr 12.4 | boric acid | 0 | 125 | 2.3 | white | N.D. | N.D. | N.D. |

N.D.: not determined

Figure 2:
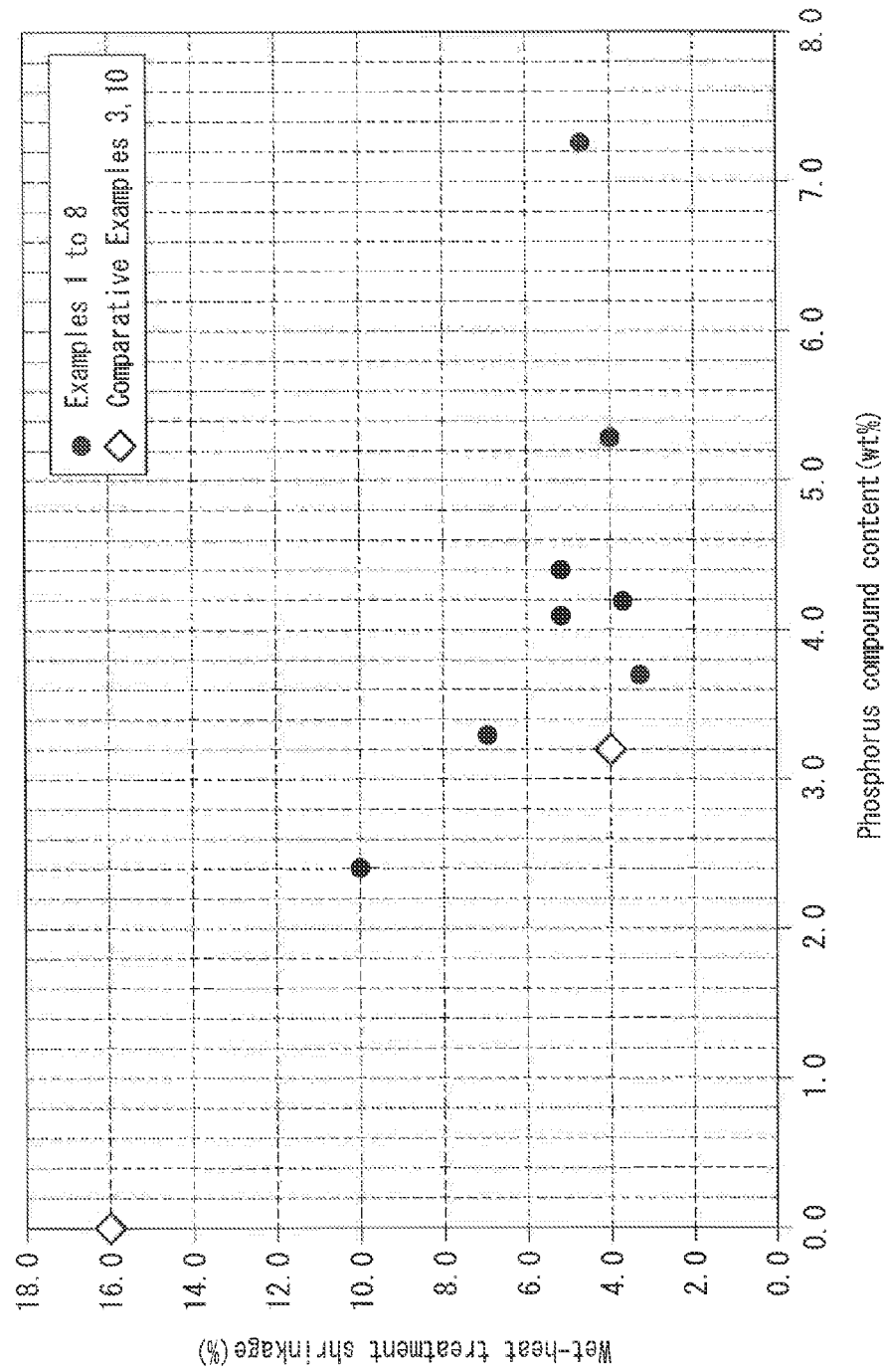
FIG. 2 is a graph showing the relationship between the phosphorus compound content in terms of phosphorus and the wet-heat treatment shrinkage of each of regenerated collagen fibers obtained in Examples 1 to 8 and Comparative Examples 3 and 10.

Further, FIG. 1 shows the relationship between the content of zirconium salt in terms of zirconium oxide (zirconium salt content) and the hair iron heat resistant temperature with regard to each of the regenerated collagen fibers of Examples 1 to 13 and Comparative Examples 1 to 7 and 10. FIG. 2 shows the relationship between the content of phosphorus compound in terms of phosphorus (phosphorus compound content) and the wet-heat treatment shrinkage with regard to each of the regenerated collagen fibers of Examples 1 to 7 and Comparative Examples 3 and 10.

As can be seen from the results shown in FIG. 1, there was a correlation between the zirconium salt content in terms zirconium oxide and the hair iron heat resistant temperature of each regenerated collagen fiber, and the heat resistance of the regenerated collagen fiber improved with the zirconium salt content.

Further, as can be seen from the results shown in Table 1 and FIG. 1, the regenerated collagen fibers of Examples 1 to 13, which had a zirconium salt content of 12 wt % or more in terms of zirconium oxide, had a hair iron heat resistant temperature of 125° C. or higher and was thus highly resistant to heat.

In contrast, the regenerated collagen fibers treated with no zirconium salt, such as the fiber of Comparative Example 7, had poor heat resistance. The regenerated collagen fibers of Comparative Examples 1 to 2, 4 to 6, and 10, which had a zirconium salt content of less than 12 wt % in terms of zirconium oxide, also had poor heat resistance.

Further, in spite of having a titanium compound content of more than 12 wt % (in terms of titanium oxide), the regenerated collagen fibers of Comparative Examples 8 and 9 treated with the titanium salt did not have sufficient heat resistance, and the reasons for this were believed to be as follows. That is, zirconium has a larger molar mass than titanium, and when these metals identical in molar number are each introduced into fibers, the weight proportion of zirconium to the fiber becomes larger than the weight proportion of titanium to the fiber. Further, zirconium may have an effect of stabilizing the structure of a collagen fiber by forming stronger cross-links with the collagen than titanium.

As is clear from the results of Comparative Example 3, the fiber had improved heat resistance as it was treated with the zirconium salt. However, since the fiber was subjected only to the zirconium salt treatment, it had poor wet-heat resistance as the wet-heat treatment shrinkage was larger than 10%. This can be problematic when processing the fiber into a hair ornament product because such a process involves a wet-heat treatment. In contrast, it was found that a fiber was able to retain heat resistance while having a reduced wet-heat treatment shrinkage of 10% or less when it had been subjected to both the zirconium salt treatment and the phosphorus compound treatment as in Examples 1 to 13. The reasons for this are believed to be as follows. That is, since zirconium has a high coordination number, it attracts hydrophilic functional groups of collagen during a wet-heat treatment, a heat treatment performed in the presence of moisture, thereby causing an increase in regenerated collagen fiber shrinkage. However, by treating the regenerated collagen fiber with a phosphorus compound to incorporate the phosphorus compound into the fiber, zirconium becomes surrounded with phosphorus as phosphorus attaches or bonds to zirconium, which prevents the zirconium from attracting hydrophilic functional groups of collagen and thus reduces the shrinkage of the regenerated collagen fiber.

As can be seen from FIG. 2 and Table 1, the regenerated collagen fibers of Examples 1 to 13, which had a phosphorus compound content of 2 wt % or more in terms of phosphorus, had a wet-heat treatment shrinkage of 10% or less and had favorable wet-heat resistance.

As is clear from the data on Comparative Examples 4 to 6 and Reference Example 2, in which the regenerated collagen fibers were treated not with the phosphorus compound but with boric acid and tannine derivatives such as pyrogallol and pyrocatechol known as compounds capable of adhering or bonding to metals, and citric acid capable of forming a complex with zirconium, only those treated with both the zirconium salt and the phosphorus compound were able to maintain heat resistance while having improved wet-heat resistance and a reduced wet-heat shrinkage.

In Comparative Example 3, Example 2, Comparative Examples 4 to 6 and Reference Example 2, the zirconium treatment was performed in the exact same manner. The regenerated collagen fiber of Example 2, which was treated with both the zirconium salt and the phosphorus compound, had almost the same zirconium salt content as that of the regenerated collagen fiber of Comparative Example 3 treated only with the zirconium salt. However, the regenerated collagen fibers of Comparative Examples 4 to 6 and Reference Example 2 had a significantly smaller zirconium salt content than that of the regenerated collagen fiber of Comparative Example 3. And as compared with the regenerated collagen fiber of Comparative Example 3, those of Comparative Examples 4 to 6 and Reference Example 2 had a reduced wet-heat shrinkage but had poor heat resistance because zirconium in the fibers was eluted. Note that boric acid causes significant problems in drain water. In addition, when boric acid is used in combination with the zirconium salt, it causes the elution of zirconium in the fiber. Thus, the heat iron heat resistant temperature can only be increased up to about 125° C.

Further, as is clear from comparisons between Examples 2, 4, 8 to 11 and 13, the regenerated collagen fibers had favorable heat resistance and wet-heat resistance and were less prone to breakages after being set using a hair iron because they contained the zirconium salt and the phosphorus compound as well as the aluminum salt.

<Production Example 1 of Flame Retardant Polyester-Based Fiber>

A mixture obtained by mixing 100 parts by weight of polyethylene terephthalate (trade name: "BK-2180" from Mitsubishi Chemical Corporation) dried to a moisture content of 100 ppm or less, 20 parts by weight of brominated epoxy flame retardant (trade name "SR-T2MP" from Sakamoto Yakuhin Kogyo Co., Ltd.), and 2 parts by weight of sodium antimonite (trade name "SA-A" from Nihon Seiko Co., Ltd.) was dry blended with a black pigment (trade name: "PESM22367 BLACK (100) D" from Dainichiseika Color & Chemicals Mfg. Co. Ltd.), a yellow pigment (trade name: "PESM1001 YELLOW (100) D" from Dainichiseika Color & Chemicals Mfg. Co. Ltd.), and a red pigment (trade name: "PESM3005 RED (100) D" from Dainichiseika Color & Chemicals Mfg. Co. Ltd.) so that the total concentration (content) of the pigments was 0.7 wt %, and the weight ratio of the black pigment, the yellow pigment, and the red pigment was 60:25:15. The polyester resin composition obtained was supplied to a twin-screw extruder (trade name: "TEX 44" from Japan Steel Works, Ltd.) and melt kneaded at a barrel set temperature of 270° C., and then was formed into pellets. The pellets obtained were dried to a moisture content of 100 ppm or less. Next, the dried pellets were supplied to a melt spinning machine (trade name "SV30" from Shinko Machineries Ltd.), and a molten polymer was extruded at a barrel set temperature of 270° C. through a spinneret with nozzle holes having a cocoon-shaped cross section (with an aspect ratio of 1.4:1). The extruded polymer was air-cooled by 20° C. cooling air, and wound up at a speed of 100 m/min, thereby providing undrawn yarns. The undrawn yarns obtained were drawn to 3.5 times using a heat roller heated to 75° C., and then were heat-treated using the heating roller at 180° C., and wound at a speed of 30 m/min. Thus, a polyester-based fiber (multifilament) with a fineness of about 65 dtex was produced.

Examples 14 to 22

The water-resistant regenerated collagen fiber of Example 1 (hereinafter referred to as "heat resistant TS1") or the water-resistant regenerated collagen fiber of Example 4 (hereinafter referred to as "heat resistant TS2") and the flame retardant polyester-based fiber obtained in Production Example 1 of a flame retardant polyester-based fiber (hereinafter referred to as "flame retardant PET") were mixed with each other in the proportions (wt %) shown in Table 2 below, thus obtaining fiber bundles for hair (total fineness: 300,000 dtex).

With regard to each of the fiber bundles for hair obtained in Examples 14 to 22, the cooling-free property at the time of styling using a hair iron, the hair iron heat resistant temperature, the flame retardancy, and the curl retention were evaluated by the following methods. The results are provided in Table 2 below. The flame retardancy of each fiber bundle for hair was evaluated by measuring an LOI value.

<Cooling-Free Property at the Time of Styling Using Hair Iron>

The cooling-free (CF) property was evaluated by the following four criteria based on the strength of a curl given to each bundle by nipping a pinch of bundle with a hair iron set to a certain temperature, and sliding the hair iron gradually along an arch from the base of the bundle (bump method).
A: very strong curl is given
B: strong curl is given
C: somewhat strong curl is given
D: curl is hardly given <Curl Retention>

After giving a permanent curl to each fiber bundle under the heat set conditions suited to the respective materials, the resistance of the curl to hot-water washing (assuming shampooing) was evaluated by the following four criteria.
A: curl is hardly stretched.
B: curl is somewhat stretched.
C: curl is stretched but still remains somewhat
D: curl is virtually stretched and hardly remains.

<LOI Value>

The LOI value was measured in conformity with JIS L 1091 E (oxygen index test). More specifically, both ends of a filaments (length: 16 cm, weight: 0.25 g) were brought together slightly with double stick tape, and the filaments were twisted using a twisting device. After twisting the filaments sufficiently, the filaments were folded at the center and were twisted again. Then, both ends of the twisted filaments were fixed to each other with Cellophane Tape® such that the twisted filaments had a total length of 7 cm, thus obtaining a sample. The sample thus obtained was pre-dried for 60 minutes at 105° C., and was further dried in a desiccator for 30 minutes or more. The dried sample was adjusted to a certain oxygen concentration. 40 seconds later, the sample was lit from the top with an igniter with the igniter flame restricted to 8 to 12 mm, and after lighting the sample, the igniter was removed. The oxygen concentration at which 5 cm or more of the sample burned or the sample kept burned for 3 minutes or more was checked. The test was repeated 3 times under the same conditions, thereby obtaining the limit oxygen index (LOI).

(Hair Iron Heat Resistant Temperature)

The hair iron heat resistant temperature was measured in an atmosphere having a temperature of 20±2° C. and a relative humidity of 65±2% as follows. One end (2 cm) of a fiber bundle for hair was nipped for 5 seconds with a hair iron adjusted to each temperature, and the highest of temperatures at which the end of the fiber bundle did not become curled was set as the hair iron heat resistant temperature. The temperature of the hair iron was changed in 5° C. increments, and a new non-ironed fiber bundle was used for each temperature measured.

TABLE 2

| | Flame retardant PET | Heat resistant TS1 | Heat resistant TS2 | Cooling-free property | Heat resistance Hair iron heat resistant temperature (° C.) | Flame retardancy LOI value | Curl retention |
|---|---|---|---|---|---|---|---|
| Ex. 14 | | 100 | | A | 180 | 38 | D |
| Ex. 15 | 20 | 80 | | A | 180 | 35 | C |
| Ex. 16 | 30 | 70 | | A | 180 | 34 | B |
| Ex. 17 | 50 | 50 | | A | 180 | 33 | B |
| Ex. 18 | 70 | 30 | | B | 180 | 31 | A |
| Ex. 19 | 80 | 20 | | D | 180 | 30 | A |
| Ex. 20 | 30 | | 70 | A | 165 | 34 | B |
| Ex. 21 | 50 | | 50 | A | 170 | 33 | B |
| Ex. 22 | 70 | | 30 | B | 175 | 31 | A |

From the results shown in Table 2, it was found that by mixing the flame retardant polyester-based fiber with the water-resistant regenerated collagen fiber of the present invention, the curl retention of the fiber bundle for hair improved. Further, the fiber bundles for hair of Examples 16 to 18 and 20 to 22 including 30 to 70 wt % of the heat resistant regenerated collagen fiber and 30 to 70 wt % of flame retardant polyester fiber not only had high heat resistance and flame retardancy but also favorable curl retention and cooling-free property at the time of styling using a hair iron.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A water-resistant regenerated collagen fiber comprising a zirconium salt and a phosphorus compound,
    wherein the water-resistant regenerated collagen fiber has a zirconium salt content of 12 wt % or more in terms of zirconium oxide and a phosphorus compound content of 2 wt % or more in terms of phosphorus.

2. The water-resistant regenerated collagen fiber according to claim 1, wherein the water-resistant regenerated collagen fiber has a zirconium salt content of 17 to 30 wt % in terms of zirconium oxide.

3. The water-resistant regenerated collagen fiber according to claim 1, wherein the water-resistant regenerated collagen fiber has a phosphorus compound content of 3 to 10 wt % in terms of phosphorus.

4. The water-resistant regenerated collagen fiber according to claim 1, further comprising an aluminum salt.

5. The water-resistant regenerated collagen fiber according to claim 4, wherein the water-resistant regenerated collagen fiber has an aluminum salt content of 1 wt % or more in terms of aluminum oxide.

6. The water-resistant regenerated collagen fiber according to claim 1, wherein the zirconium salt is one or more selected from the group consisting of zirconium sulfate, zirconium acetate, and zirconium oxychloride.

7. The water-resistant regenerated collagen fiber according to claim 1, wherein the phosphorus compound is one or more selected from the group consisting of phosphoric acid, phosphate, phosphoric acid derivative, phosphate derivative, diphosphoric acid, diphosphate, diphosphoric acid derivative, diphosphate derivative, metaphosphoric acid, metaphosphate, metaphosphoric acid derivative, metaphosphate derivative, polyphosphoric acid, polyphosphate, polyphosphoric acid derivative, polyphosphate derivative, phosphonic acid, phosphonate, phosphonic acid derivative, and phosphonate derivative.

8. The water-resistant regenerated collagen fiber according to claim 1, wherein the water-resistant regenerated collagen fiber has a wet-heat treatment shrinkage of 10% or less.

9. The water-resistant regenerated collagen fiber according to claim 1, wherein the water-resistant regenerated collagen fiber has a hair iron heat resistant temperature of 125° C. or higher.

10. The water-resistant regenerated collagen fiber according to claim 9, wherein the water-resistant regenerated collagen fiber has a hair iron heat resistant temperature of 160° C. or higher.

11. The water-resistant regenerated collagen fiber according to claim 1, wherein the water-resistant regenerated collagen fiber is crosslinked with an epoxy compound.

12. A method for producing a water-resistant regenerated collagen fiber, comprising:
    treating a regenerated collagen fiber with a zirconium salt to incorporate the zirconium salt into the regenerated collagen fiber, and then treating the regenerated collagen fiber with a phosphorus compound to incorporate the phosphorus compound into the regenerated collagen fiber, thereby obtaining a water-resistant regenerated collagen fiber containing 12 wt % or more of zirconium salt in terms of zirconium oxide and 2 wt % or more of phosphorus compound in terms of phosphorus.

13. The method according to claim 12, further comprising crosslinking the regenerated collagen fiber with an epoxy compound before incorporating the zirconium salt into the regenerated collagen fiber.

14. A fiber bundle for hair comprising 30 to 100 wt % of a water-resistant regenerated collagen fiber comprising a zirconium salt and a phosphorus compound and 0 to 70 wt % of polyester-based fiber,
wherein the water-resistant regenerated collagen fiber has a zirconium salt content of 12 wt % or more in terms of zirconium oxide and a phosphorus compound content of 2 wt % or more in terms of phosphorus.

15. The fiber bundle for hair according to claim 14, wherein the polyester-based fiber comprises 5 to 40 parts by weight of brominated epoxy flame retardant with respect to 100 parts by weight of polyester resin, and the polyester resin is polyalkylene terephthalate and/or copolymerized polyester comprising polyalkylene terephthalate as the main component.

16. The fiber bundle for hair according to claim 14, wherein water-resistant regenerated collagen fiber further comprising an aluminum salt.

17. The fiber bundle for hair according to claim 14, wherein the water-resistant regenerated collagen fiber has an aluminum salt content of 1 wt % or more in terms of aluminum oxide.

18. The fiber bundle for hair according to claim 14, wherein the zirconium salt is one or more selected from the group consisting of zirconium sulfate, zirconium acetate, and zirconium oxychloride.

19. The fiber bundle for hair according to claim 14, wherein the phosphorus compound is one or more selected from the group consisting of phosphoric acid, phosphate, phosphoric acid derivative, phosphate derivative, diphosphoric acid, diphosphate, diphosphoric acid derivative, diphosphate derivative, metaphosphoric acid, metaphosphate, metaphosphoric acid derivative, metaphosphate derivative, polyphosphoric acid, polyphosphate, polyphosphoric acid derivative, polyphosphate derivative, phosphonic acid, phosphonate, phosphonic acid derivative, and phosphonate derivative.

20. The fiber bundle for hair according to claim 14, wherein the water-resistant regenerated collagen fiber is crosslinked with an epoxy compound.

* * * * *